United States Patent Office 3,033,812
Patented May 8, 1962

3,033,812
VINYLIDENE AND VINYL CHLORIDE COPOLYMER
Philip K. Isaacs, Brookline, and Alexei Trofimow, Cambridge, Mass., assignors to W. R. Grace & Co., Cambridge, Mass., a corporation of Connecticut
No Drawing. Filed May 28, 1958, Ser. No. 738,318
5 Claims. (Cl. 260—31.8)

This invention relates to the preparation of clear, heat-shrinking copolymers of vinylidene chloride and vinyl chloride.

The most commonly employed method for copolymerizing vinylidene chloride and vinyl chloride is to polymerize a single charge containing between 60 and 80% of vinylidene chloride until the desired conversion is reached. The polymerization is usually carried out in aqueous emulsion with water soluble catalyst. This process is accompanied by a rise in pressure due to the more rapid disappearance of vinylidene chloride, leaving an excess of vinyl chloride. As a result, there is formed a heterogeneous polymer whose properties depend upon the degree of conversion. In order to obtain a polymer having high heat shrinkage, it is necessary to get high conversion. This invariably leads to a cloudy film since a high conversion polymer is so heterogeneous that partial incompatibility results.

It has previously been proposed to continuously add a mixture of monomers to an emulsion copolymerization mixture of vinylidene chloride and vinyl chloride. In such procedure the monomers are added in the same proportions as the composition of the monomer constituents chemically combined in the copolymer. Since vinylidene chloride polymerizes at a much faster rate than vinyl chloride, the percent of vinylidene chloride in the copolymer will be higher than the percent of vinylidene chloride in the added monomers. Hence, it is impossible by this procedure to obtain a uniform copolymer unless the ratio of vinylidene chloride to vinyl chloride is continuously changed, i.e., reduced, to compensate for the difference in polymerization rates. Such continuous change in proportions of the continuously added monomers is not economically feasible.

According to another proposal the proportion of vinylidene chloride to vinyl chloride in the copolymer is kept constant by subjecting an agitated aqueous suspension of a mixture of from 50 to 90% of vinylidene chloride monomer and from 50 to 10% of vinyl chloride monomer to interpolymerization conditions in a closed system at a constant temperature and bleeding monomer vapor rich in vinyl chloride from the system during the polymerization. The vapor is bled off during the last half of the polymerization to prevent the pressure from exceeding a value corresponding to that of the selected mixture of monomers at the constant temperature. The problem is encountered of recovering and purifying the impure vinyl chloride bled off during the polymerization.

It is an object of the present invention to devise an improved procedure for forming homogeneous copolymers of vinylidene chloride and vinyl chloride.

Another object is to prepare such copolymers which can be extruded to form products having increased tensile strength.

A further object is to prepare such copolymers having improved clarity, i.e., reduced haze.

Still another object is to prepare such copolymers which form films of reduced brittleness.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the aqueous emulsion copolymerization of vinylidene chloride and vinyl chloride utilizing certain critical conditions set forth hereinafter.

According to the invention vinylidene chloride and vinyl chloride are copolymerized in an aqueous emulsion while maintaining the monomers present in the mixture at a constant ratio from 40:60 to 60:40. The preferred ratio is 60 parts vinylidene chloride to 40 parts vinyl chloride, which ratio yields a polymer containing 78% vinylidene chloride. The ratio is held constant by the continuous addition of vinylidene chloride to the polymerization reactor. All of the vinyl chloride is added initially, but only 25% to 38%, preferably about 33%, of the vinylidene chloride is added initially. The reaction can be carried out at 20–40° C., preferably about 30° C. The reaction is continued at substantially constant pressure. It is critical that the pressure of the monomers during polymerization be maintained between 27 and 30 p.s.i., preferably about 28 p.s.i. when the reaction is carried out at 30° C. A change of 0.5 p.s.i. in reaction pressure can produce a 20% change in shrink of the final stretched polymer. Such pressures give a product having a melting point of 118–122° C., and it is important that the melting point be within this range in order to obtain a product having optimum characteristics. It was observed that products having unaccountably high melting points were made on very cold days when the vinylidene chloride had been kept outside overnight. It was found that if the vinylidene chloride employed had a temperature of 4° C., it contained dissolved air in an amount equivalent to 1 p.s.i. in an 80 gallon reactor when used at a reactor temperature of 30° C. Furthermore, when more cold monomer is added continuously to the reactor, the effect is magnified. The apparent pressure is higher than the actual pressure due to monomers alone; more vinylidene chloride must be let in to keep the pressure down, and thus a vicious cycle is formed. The result is a polymer of very high vinylidene content and consequent high melting point and low shrink, all of which are undesired. This is surprising since normally one would expect that a high reaction pressure was indicative of high vinyl chloride content and, hence, extremely low melting point.

In order to eliminate the variable caused by the introduction of air into the batch, the vinylidene chloride monomer is boiled or distilled just prior to being added to the batch to remove dissolved gases. This insures a product having a high shrink value and uniform, desired properties.

After the reaction has started, the pressure is allowed to go up to 27 to 30 p.s.i., preferably 28 p.s.i. at 30° C.±0.2° C., and is maintained at this pressure ±0.2 p.s.i. during the reaction which lasts 6 to 8 hours. This is continued until the pressure begins to drop spontaneously, generally at about 30% total solids. The vinylidene chloride flow is shut off automatically and after the pressure has fallen 2 p.s.i., the batch is cooled and stripped from the container at a vacuum of at least 20 inches and a temperature of about 20° C.

Preferably, the reaction is carried out at a pH of 2.5 to 2.8. The preferred emulsifying agent is Aerosol MA (dihexyl sodium sulfosuccinate) although other emulsifying agents can be employed such as the alkali metal alkyl and alkylene sulfates and sulfonates, such as sodium lauryl sulfate, potassium cetyl sulfate, sulfonated Turkey red oil, etc.

The preferred catalyst is potassium persulfate, but other catalysts can be employed such as sodium persulfate, hydrogen peroxide, peracetic acid, benzoyl peroxide and azo-bis-isobutyrodinitrile.

Unless otherwise stated, all parts and percentages are by weight. Unless otherwise indicated, all pressures are gauge pressures.

The preferred procedure is illustrated in Example 1.

EXAMPLE 1

A glass lined, pressure-tight reactor was evacuated to 26 inches of vacuum, pressured with 2 p.s.i. of vinyl chloride, and then evacuated again. There was then sucked in an aqueous phase consisting of 317 parts water, 6 parts Aerosol MA (80%), 0.35 part of potassium persulfate, 0.18 part sodium bisulfite and 0.18 part of nitric acid (69%). A 26 inch vacuum was again applied and the reactor pressured with 2 p.s.i. of vinyl chloride. The temperature was 20° C. The reactor was then heated to 30° C. and held at this temperature throughout the subsequent reaction. There was then added with vigorous stirring a mixture of 60 parts of vinylidene chloride and 40 parts of vinyl chloride. (The vinylidene chloride was boiled gently at 31° C. just prior to use to free it of dissolved gases which would otherwise throw the pressure off.) The pressure at this point was 28 p.s.i. and the temperature 30° C. The pressure was allowed to rise to 29 p.s.i. and then 120 parts of air-free vinylidene chloride was continuously let in by a proportionating pump controlled by a pressure recorder. The flow was such as to maintain a 29 p.s.i.±0.2 p.s.i. pressure. The reaction was continued until the pressure began to drop off spontaneously (about 7 hours), at about 30% total solids. The vinylidene chloride flow shut off automatically and the pressure was allowed to fall 2 p.s.i. Then the batch was stripped and cooled. Stripping was continued for 90 minutes at 20 inches of vacuum and at 20° C. The final total solids was about 33%. The pH throughout the reaction was about 2.6.

In order to coagulate the latex, 1 volume of 0.2% aqueous calcium nitrate solution was added to a jacketed vessel and brought to 20° C. Then 1 volume of 0.47% aqueous calcium nitrate and 1 volume of the vinylidene chloride-vinyl chloride copolymer latex at 37% total solids were run in simultaneously with vigorous agitation. The entire batch was heated to 60° C. for one hour in order to crystallize the particles. The wet crumbs were decanted and centrifuged at 900 r.p.m. against a stainless steel screen to a solids content of about 35%. These crumbs were then washed with 1 volume of water (based on 1 volume of original latex) to remove residual emulsifier and catalyst.

The product was dried in an oven to 0.2% moisture and had a bulk density of 0.5. (It was observed that shorter stripping times resulted in lower bulk densities, e.g., a stripping time of 30 minutes resulted in a product having a bulk density of 0.40. The use of such lower bulk densities, e.g., 0.40, results in poorer feed properties on large extruders.)

The copolymer was blended with 6 to 10% of dibutyl sebacate and then stretch-oriented as disclosed in United States Patent No. 2,452,080, to form a heat-shrinking film having a clarity of 1% haze, 55% heat shrinkage at 205° F., a tensile strength of 12,000 p.s.i. at room temperature. It was observed that the polymer had excellent feed and extrudability properties and also excellent heat stability.

The improvement in properties obtained by the invention is shown by a comparison of Examples 2 and 3. Example 2 illustrates one of the best present commercial procedures for copolymerizing vinylidene chloride and vinyl chloride to obtain a copolymer which has good shrink properties. Example 3 shows the improvement in properties obtained by substituting the technique of the present invention for the one shot addition of monomers employed in Example 2.

EXAMPLE 2

Aqueous Phase

| | parts |
|---|---|
| Water | 180 |
| Potassium persulfate | 0.22 |
| Sodium bisulfite | 0.11 |
| Aerosol MA (80%) | 3.58 |
| Nitric acid (69%) | 0.07 |

Monomers

| | parts |
|---|---|
| Vinylidene chloride | 68.5 |
| Vinyl chloride | 31.5 |

Reaction Conditions

| | |
|---|---|
| pH | 2.4–2.7 |
| Temperature ° C | 25±0.5 |
| Stirring rate r.p.m | 250–300 |

The aqueous phase was mixed together and charged into an evacuated (26 inches vacuum) glass lined, pressure reactor. Vacuum of 26 inches was applied to the aqueous phase to remove dissolved air. The monomers were mixed together in a bomb and then pressured into the reactor with nitrogen. The temperature of reaction was maintained with constant cooling at 25° C.±0.5° C. Polymerizaion was continued until the total solids content of the latex was 35%, representing at least 97% conversion of monomers to copolymer. During this time, the pressure rose spontaneously from 20 p.s.i. to 40 p.s.i. and then fell to 25 p.s.i. when the reaction was about at completion. The time required for the reaction was about 7 hours. The excess monomer was then stripped off with application of a 20 inch vacuum for 45 minutes.

Coagulation and Drying

| | |
|---|---|
| 0.2% aqueous calcium chloride solution | 1 vol. (solution 1). |
| 0.47% aqueous calcium chloride solution | 1 vol. (solution 2). |
| 35% total solids copolymer latex | 1 vol. |
| Water | 1 vol. |

Solution 1 was placed in a glass lined tank and brought to 20° C. While stirring vigorously, solution 2 and the latex were slowly added simultaneously. The temperature was held at 20° C. during the addition. After coagulation was completed, the batch was heated to 60° C. for 45 minutes in order to crystallize the particles. Stirring was continued during this time. The wet crumbs were then centrifuged at 900 r.p.m. to a moisture content of about 35%. The crumbs were washed on the centrifuge with the 1 volume of water heated to 55° C. The polymer was dried to a moisture content of less than 0.2% in an oven.

The latex product was white and had no off-color. The dry copolymer had an M.P. of 125–130° C., a bulk density of 0.45–0.50 and was a white powder, free from contamination of any sort.

EXAMPLE 3

Aqueous Phase

| | Parts |
|---|---|
| Water | 180 |
| Potassium persulfate | 0.22 |
| Sodium bisulfite | 0.11 |
| Aerosol MA (80%) | 3.58 |
| Nitric acid (69%) | 0.07 |

Monomers

| | |
|---|---|
| Vinylidene chloride | parts_ 33 |
| Vinyl chloride | do_ 22 |
| Vinylidene chloride (for continuous addition) | do_ 45 |

Reaction Conditions

| | |
|---|---|
| pH | 2.4–2.7 |
| Temperature °C | 30±0.5 |
| Pressure p.s.i. | 29±0.5 |
| Stirring rate r.p.m. | 250–300 |

The aqueous phase was mixed together and charged into an evacuated (26 inches vacuum) glass lined, pressure reactor. Vacuum of 26 inches was applied to the aqueous phase to remove dissolved air. The 33 parts of vinylidene chloride and 22 parts of vinyl chloride were mixed in a bomb and charged into the reactor, after heating the aqueous phase to 30° C., with vigorous stirring. Then the 45 parts of vinylidene chloride were placed in a tank connected to a proportionating pump. This pump was set to deliver vinylidene chloride to the batch so as to maintain the pressure at 29.0 p.s.i. at 30° C. The initial pressure of the first mixture of monomers charge was 29 p.s.i. The pressure tended to rise during the polymerization. The continuous addition of vinylidene chloride was required to keep the pressure constant. The reaction was continued at a temperature of 30° C. and a pressure of 29 p.s.i. until the pressure began to fall spontaneously. When the pressure began to fall, the vinylidene chloride pump was shut off, and the pressure allowed to fall 2 p.s.i. to 27 p.s.i. This corresponds with a total solids of about 34% or a conversion of about 87% based on the total amount of monomers added. The time required was 7 hours. At this point, the mixture was cooled rapidly to 20° C., vented and stripped at 20 inches vacuum for 75 minutes. The copolymer latex was coagulated and dried exactly as in Example 2.

The latex product was white and had no off-color. The dry copolymer had an M.P. of 118–122° C., a bulk density of 0.45–0.50 and was a white powder, free from contamination of any sort.

The copolymers prepared in Examples 2 and 3 were each blended with 6–10% of dibutyl sebacate and then extruded and stretch oriented as disclosed in United States Patent No. 2,452,080 to form products having the following properties:

| Properties | Example 2 | Example 3 |
|---|---|---|
| Heat shrinkage (average of 185° F. and 205° F.), percent | 45–55 | 45–55. |
| Tensile strength, p.s.i. | 8,500 | 10,000–12,000. |
| Clarity | 10% | <5% haze. |
| Heat stability | <Example 3 | >Example 2. |
| 10° F. Modulus (the higher the modulus the more brittle the film), p.s.i. | 275,000 | 135,000. |
| Feed in hopper | Excellent | Excellent. |
| Extrudability | do | Do. |

EXAMPLE 4

*Aqueous Phase*

| | |
|---|---|
| Water parts | 180 |
| Potassium persulfate do | 0.22 |
| Sodium bisulfite do | 0.11 |
| Nitric acid (69%) do | 0.11 |
| Di-hexyl sodium sulfoscuccinate do | 3.0 |

*Monomers*

| | |
|---|---|
| Vinylidene chloride parts | 33 |
| Vinyl chloride do | 22 |
| Vinylidene chloride held out do | 45 |

The aqueous phase was loaded into a glass lined pressure reactor and de-aerated. A mixture of the 33 parts vinylidene chloride and 22 parts vinyl chloride was charged into the reactor with vigorous stirring. The 45 parts of vinylidene chloride held out were placed in a bomb connected to the reactor. The temperature of the reactor was kept at 30° C. and the pressure at 29 p.s.i. Vinylidene chloride from the bomb was gradually added to maintain the pressure at 29 p.s.i. This represented a constant 60 to 40 vinylidene chloride to vinyl chloride ratio. After about 8 hours, the vinylidene chloride in the bomb was used up. At this point the pressure in the reactor began to fall due to the consumption of the bulk of the vinyl chloride. After the pressure had fallen to 27 p.s.i., the reactor cooled rapidly and the unreacted monomer was stripped off with vacuum. This point was between 85 and 90% conversion of monomers to copolymer.

The latex (32–35% solids) was then added slowly to a stirred 0.2% calcium chloride solution, the slurry heated to 60° C. for 30 minutes and then the mixture centrifuged and washed with water to remove emulsifier and catalyst. The crumbs obtained were dried at 70° C. for 12 hours.

The dry polymer was then compounded with dibutyl sebacate and extruded and stretch oriented as in Example 3. The film obtained had the following characteristics:

| | |
|---|---|
| Clarity | 1% haze. |
| Heat shrinkage | 55% at 205° F. |
| Tensile strength | 12,000 p.s.i. |
| 10° F. modulus | 135,000 p.s.i. |
| Feed in hopper | Excellent. |
| Extrudability | Excellent. |
| Heat stability | Adequate. |

In other examples similar to Example 4 in which vinylidene chloride was continuously added during the copolymerization of vinylidene chloride and vinyl chloride to maintain the monomer ratio at 60% vinylidene chloride and 40% vinyl chloride stretched plasticized films (6–10% dibutyl sebacate plasticizer) had tensile strengths between 12,000 and 13,600 p.s.i., shrinks between 62 and 67% at 205° F. and 2.7–3.9% haze.

Films prepared from the vinylidene chloride-vinyl chloride copolymers of the present invention have tensile strengths of 10,000 to 12,000 p.s.i., clarity of 1–3% haze, heat shrinkage of 50–70% at 205° F., a 10° F. modulus of 100,000 to 300,000 p.s.i. and adequate fabrication properties.

What is claimed is:

1. In a process for production of a copolymer of vinylidene chloride and vinyl chloride of substantially homogeneous composition wherein a mixture containing 60 to 40% of monomeric vinylidene chloride and 40 to 60% of monomeric vinyl chloride is subjected to polymerizing conditions in aqueous emulsion, the improvement which comprises carrying out the polymerization at a temperature between 20 and 40° C. and at a pressure maintained between 27 to 30 p.s.i.g. while continuously adding only vinylidene chloride from which the dissolved gases are removed prior to its introduction into the polymerization vessel to maintain the pressure constant and to maintain the ratio of vinylidene chloride monomer to vinyl chloride monomer constant and stopping the polymerization after at least 80% of the monomers have been polymerized.

2. A process according to claim 1 wherein the ratio of monomeric vinylidene chloride to monomeric vinyl chloride is maintained at 60 to 40.

3. A process according to claim 2 wherein the temperature is maintained at 30° C.

4. A process according to claim 2 wherein the pressure is maintained at 28 p.s.i.g. at 30° C.

5. A composition of matter containing 6 to 10% of dibutyl sebacate and a copolymer of vinylidene chloride and vinyl chloride prepared by subjecting a mixture containing 60 to 40% of monomeric vinylidene chloride and 40 to 60% of monomeric vinyl chloride to polymerizing conditions in aqueous emulsion, said polymerization having been carried out at a temperature between 20 and 40° C. and at a pressure maintained between 27 and 30 p.s.i.g. while continuously adding only vinyl chloride from which the dissolved gases were removed prior to its introduction into the polymerization vessel to maintain the pressure constant and to maintain the ratio of vinylidene chloride monomer to vinyl chloride monomer constant and stopping the polymerization after at least 80% of the monomers have been polymerized, said copolymer having a melting point of 118 to 122° C., said composition being characterized by the property that it can be formed into film having a tensile strength of 10,000 to 12,000 p.s.i., a clarity of 1 to 3% haze, a heat shrinkage of 50 to 70% at 205° F. and a 10° F. modulus of 100,000 to 300,000.

References Cited in the file of this patent

UNITED STATES PATENTS

| | | |
|---|---|---|
| 1,100,900 | Fikentscher et al. | Nov. 30, 1937 |
| 2,462,354 | Brubaker et al. | Feb. 22, 1949 |
| 2,462,422 | Plambeck | Feb. 22, 1949 |
| 2,475,016 | De Nie | July 5, 1949 |
| 2,482,771 | Heerema | Sept. 27, 1949 |
| 2,538,025 | Moore et al. | Jan. 16, 1951 |